US012742042B2

(12) United States Patent
Cheng et al.

(10) Patent No.: US 12,742,042 B2
(45) Date of Patent: Sep. 22, 2026

(54) POLYETHER DERIVATIVE AND PREPARATION METHOD THEREFOR

(71) Applicant: GUANGDONG UNIVERSITY OF PETROCHEMICAL TECHNOLOGY, Maoming (CN)

(72) Inventors: Liang Cheng, Maoming (CN); Jie Zhang, Maoming (CN)

(73) Assignee: GUANGDONG UNIVERSITY OF PETROCHEMICAL TECHNOLOGY, Maoming (CN)

( * ) Notice: Subject to any disclaimer, the term of this patent is extended or adjusted under 35 U.S.C. 154(b) by 425 days.

(21) Appl. No.: 18/025,645

(22) PCT Filed: Nov. 27, 2020

(86) PCT No.: PCT/CN2020/132472

§ 371 (c)(1),
(2) Date: Mar. 10, 2023

(87) PCT Pub. No.: WO2022/110068

PCT Pub. Date: Jun. 2, 2022

(65) Prior Publication Data

US 2023/0331912 A1 Oct. 19, 2023

(51) Int. Cl.

| | |
|---|---|
| ***C08G 18/48*** | (2006.01) |
| ***C08G 18/71*** | (2006.01) |
| ***C08G 65/333*** | (2006.01) |
| ***C08G 65/334*** | (2006.01) |

(52) U.S. Cl.

CPC ..... *C08G 65/3348* (2013.01); *C08G 18/4854* (2013.01); *C08G 18/715* (2013.01); *C08G 65/33344* (2013.01); *C08G 65/334* (2013.01)

(58) Field of Classification Search

CPC ............ C08G 65/33344; C08G 65/334; C08G 65/3348

See application file for complete search history.

(56) References Cited

U.S. PATENT DOCUMENTS 5,130,348 A * 7/1992 Zahler ....................... A61K 6/90 528/424

FOREIGN PATENT DOCUMENTS

| | | | | | |
|---|---|---|---|---|---|
| CN | 109679086 | A | | 4/2019 | |
| CN | 111378110 | | | 7/2020 | |
| CN | 111378110 | A | * | 7/2020 | ....... C08G 65/33358 |
| EP | 0084227 | A | | 7/1983 | |
| EP | 1013264 | A1 | * | 6/2000 | ............. A61Q 19/00 |
| WO | 199005172 | | | 5/1990 | |
| WO | WO-9005172 | A | * | 5/1990 | ............... C09K 5/04 |
| WO | WO-9723553 | A1 | * | 7/1997 | ............. C08G 77/46 |
| WO | WO-0238645 | A1 | * | 5/2002 | ............... C09D 7/43 |

OTHER PUBLICATIONS

CN-111378110-A_English Translation.*
ISR of PCT/CN2020/132472.

* cited by examiner

*Primary Examiner* — Michael L Leonard
(74) *Attorney, Agent, or Firm* — JEEN IP LAW, LLC

(57) ABSTRACT

The present invention discloses a polyether derivative and a preparation method therefor. The polyether derivative is:

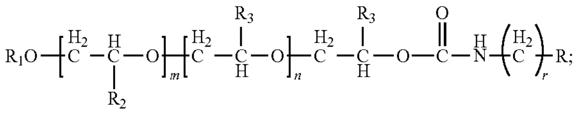

the polyether derivative of the present invention has a functional group introduced into the polyether chain, such that the derivative has an ether bond, an ester group, an amino group, a heteroatom, and other groups, enabling the derivative to have various functions such as anti-oxidation, anti-wear functionality, and anti-rust functionality, either without requiring additional additives or requiring fewer additional additives used to make up for the lack of base oil functions.

8 Claims, No Drawings

POLYETHER DERIVATIVE AND PREPARATION METHOD THEREFOR

TECHNICAL FIELD

The present invention relates to a lubricant and a preparation method therefore, and in particular to a polyether derivative and a preparation method therefor.

BACKGROUND

Lubricating oil is a liquid or semisolid lubricant used on various automobiles and mechanical equipment to reduce friction and protect machinery and workpieces, and mainly plays the roles of lubrication, cooling, rust prevention, cleaning, sealing and buffering. The lubricating oil is generally composed of two parts: base oil and an additive. The base oil is the main component of the lubricating oil and determines the basic properties of the lubricating oil. The additive can make up for and overcome the defects of the performance of the base oil, provides some new properties, and is also an important part of the lubricating oil. In the common concept, the base oil component in the lubricating oil is difficult to have the function of the additive. It is usually necessary to add corresponding additives to improve the performance of certain aspects, mainly because the base oil component does not have the functional requirements required by the product, such as anti-rust functionality, anti-oxidation and anti-wear functionality.

Polyether (also known as polyether glycol) belongs to Class V base fluid, and receives much concern due to its advantages of high viscosity index, low pour point and good cleanliness. When the polyether is used as the base oil, it is necessary to add functional additives such as high temperature antioxidants, anti-wear agents and anti-rust agents to make up for the defects of the function of the base oil.

SUMMARY

A technical problem to be solved by the present invention is to provide a polyether derivative with good anti-oxidation, ani-wear functionality, and anti-rust functionality with respect to the defects of the prior art.

A further technical problem to be solved by the present invention is to provide a preparation method for the polyether derivative with simplicity, high production efficiency and environmental protection of the technology.

To solve the technical problems, the present invention adopts the following technical solution:

A polyether derivative is a compound with the following structure:

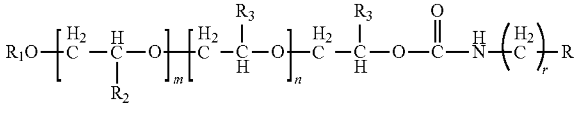

in the formula, m=0-100, and n=0-100; m and n are not both zero; r is 0-5; m, n and r are integers and satisfy charge balance; $R_1$ is alkane of $C_1$-$C_{30}$; $R_2$ is hydrogen, methyl or

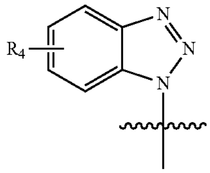;

$R_3$ is

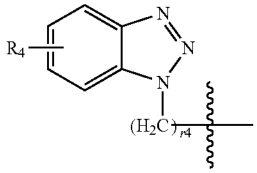

or alkane of $C_2$-$C_{30}$; $R_4$ is hydrogen or alkane (if $C_1$-$C_4$; $r_4$ is any integer of 1-20;

R is one of

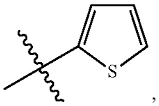,
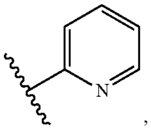,
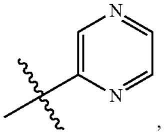,
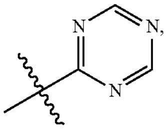,
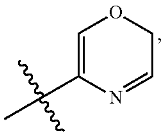,
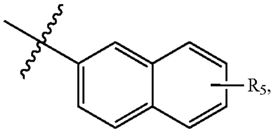,
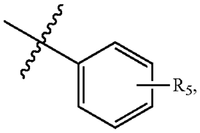,
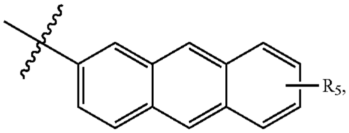,
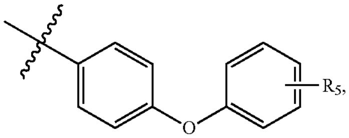,
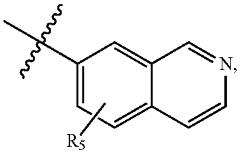,
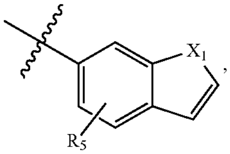,
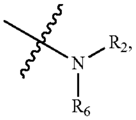,
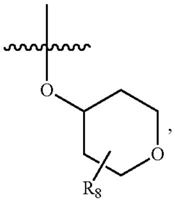, -continued

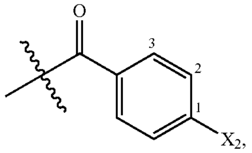 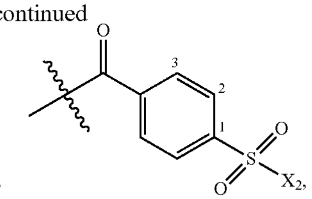

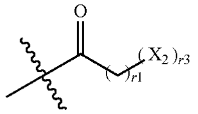 and 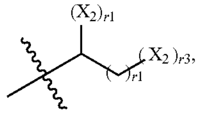

wherein $R_5$ is hydrogen or alkane of $C_1$-$C_{20}$; $X_1$ is S or O; $R_6$, $R_7$ and $R_8$ are hydrogen or alkane of $C_1$-$C_5$; $X_2$ is one of F, Cl and Br, and $X_2$ is connected at any position of 1·2 and 3 positions on a benzene ring; $r_1$ is any integer of 1-3; $r_2$ is any integer of 0-2; and $r_3$ is any integer of 1-3.

The above polyether derivatives can be divided into the following three types:

The first polyether derivative is a compound with the following structure:

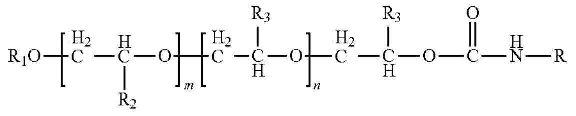

in the formula, $R_1$ is alkane of $C_1$-$C_{10}$;

$R_2$ is

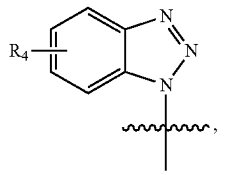

wherein $R_4$ is selected from alkane of $C_1$-$C_5$;

$R_3$ is

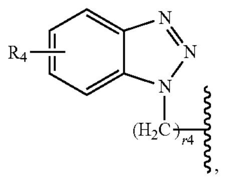

wherein $R_4$ is selected from alkane of $C_1$-$C_2$ and $r_4$ is any integer of 1-10;

R is

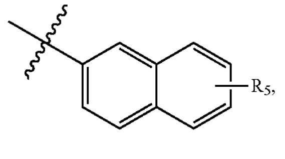 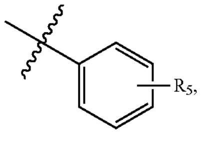

-continued

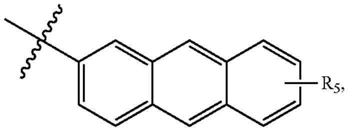

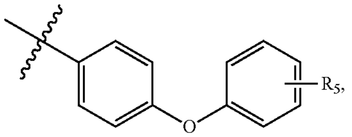

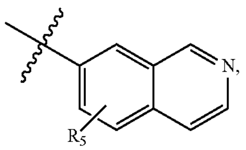 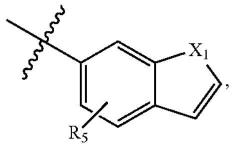

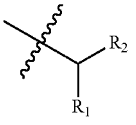 and 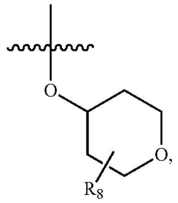

wherein $R_5$ is selected from hydrogen or alkane of $C_1$-$C_5$.

The second polyether derivative is a compound with the following structure:

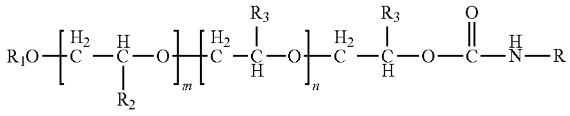

in the formula, m=0-50, n=0-50 and n and n are not both zero.

$R_3$ is alkane of $C_1$-$C_5$; $R_2$ is hydrogen or methyl; $R_3$ is alkane of $C_2$-$C_5$; R is one of

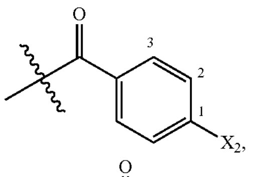 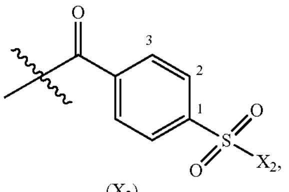

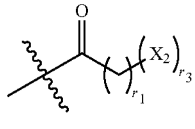 and 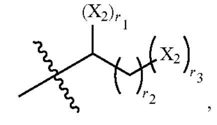 , wherein $X_2$ is one of F, Cl and Br, and is in the benzene ring; $X_2$ is connected at any position of 1, 2 and 3 positions on the benzene ring; $r_1$ is any integer of 1-3; $r_2$ is any integer of 0-2; and $r_3$ is any integer of 1-3.

The third polyether derivative is a compound with the following structure:

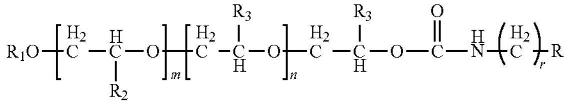

in the formula, m=0-50, n=0-50, and m and n are not bot zero; $R_1$ is alkane of $C_1$-$C_5$; $R_2$ is hydrogen or methyl; $R_3$ is alkane of $C_2$-$C_5$; and r is 1-5; R is one of

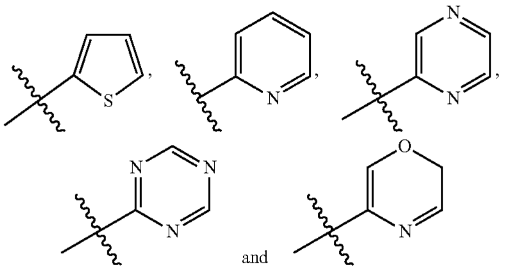

and

A preparation method for the first polyether derivative comprises the following steps:

A. selecting raw materials: 40-50 parts of chloro epoxyalkane, a catalyst, alkyl alcohol compound of $C_1$-$C_{15}$, 40-50 parts of benzotriazole or derivatives thereof, 40-50 parts of isocyanate compound, and 0.5-3 pans of diluent; the catalyst selects Zn—Co bimetallic catalyst or alkaline catalyst; the diluent is composed of solvent A and solvent B with a mass ratio (10-20):(1-5), the solvent A is selected from dichloromethane, trichloromethane and tetrachloromethane; and the solvent B is selected from tetrahydrofuran, furan, pyridine, pyrazine and pyrrole;

B. adding the catalyst to a dry reactor protected by inert gas, with the addition amount of the catalyst being 20-100 ppm (mass ratio) of the product, and then adding the alkyl alcohol compound of the initiator $C_1$-$C_{15}$ and a chloro epoxyalkane, wherein the molar ratio of the initiator and the chloro epoxyalkane is (0.1:1)-(1:5); heating the reactor to 30-100° C.; maintaining pressure to be less than 1.5 MPa; when the temperature starts to rise and the pressure starts to drop, continuously adding another chloro epoxyalkane to the reactor at a rate of 0.5-3 mL/min; continuing the aging for 1-3 hours; stopping the heating and cooling the reactor to room temperature; and filtering to obtain polyether;

C. heating a reaction vessel with polyether to 50-80° C.; slowly adding benzotriazole or derivatives thereof into the vessel: raising the temperature and keeping reaction temperature at 100-120° C. to react for 1-12 hours; and at the end of the reaction, obtaining compound 1 with hydroxyl at an end and benzotriazole in a main chain;

D. dissolving 40-50 parts of isocyanate compound into 0.5-3 parts of diluent; keeping the temperature at 40-50° C.; and stirring for 20-40 minutes to prepare solution 1;

E. dropwise adding the solution 1 to 40-50 parts of compound 1; after dropwise adding, raising the temperature to 50-90° C.; and aging for 1.5-2 hours to obtain the polyether derivative.

A preparation method for the second polyether derivative comprises the following steps:

A. weighing raw materials: 40-50 parts of polyether, 40-70 parts of carbonyl compound containing isocyanate and 1-3 parts of diluent; the polyether selects one or a copolymer of any combination of single-ended polyethylene glycol, single-ended ethylene oxide homopolymer, single-ended propylene oxide homopolymer, single-ended tetrahydrofuran homopolymer and single-ended long chain epoxy alkane homopolymer; the carbonyl compound containing isocyanate is selected from any one of

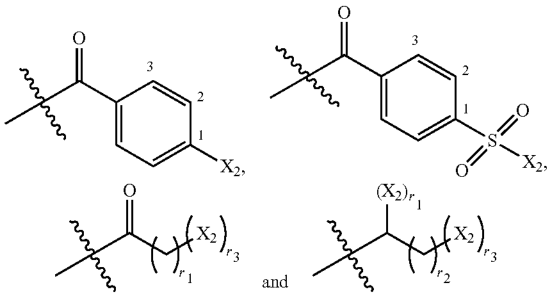

and groups, wherein $X_2$ is one of F, Cl and Br, and $X_2$ is connected at any position of 1, 2 and 3 positions on the benzene ring; r is any integer of 1-3; $r_1$ is any integer of 1-3; and $r_2$ is any integer of 0-2;

B. dissolving 40-70 parts of carbonyl compound containing isocyanate into 1-3 parts of diluent; keeping the temperature at 40-50° C.; and stirring for 20-40 minutes to prepare solution 1;

C. dropwise adding the solution 1 to 40-50 parts of polyether at 0.1-1 mL/min; after dropwise adding, raising the temperature to 50-90° C.; and aging for 1.5-2 hours to obtain the polyether derivative.

A preparation method for the third polyether derivative comprises the following steps:

A. weighing raw materials: 40-70 parts of polyether, 40-70 parts of aryl compound containing isocyanate and 0.5-3 parts of diluent: the diluent is formed by mixing solvent A and solvent B with a mass ratio (10-20):(1-5); the solvent A is selected from dichloromethane, trichloromethane and tetrachloromethane; and the solvent B is selected from tetrahydrofuran, furan, pyridine, pyrazine and pyrrole;

B. dissolving the aryl compound containing isocyanate into the diluent to obtain solution 1; dropwise adding the solution 1 to a reaction vessel containing polyether at temperature of 50-60° C. and at a rate of 0.1-2 mL/min; and after dropwise adding, continuing the stirring for 20-40 min;

C. heating the reaction vessel to 60-90° C.; and aging for 1-2 hours to obtain the polyether derivative.

Further, in the preparation method for the polyether derivative, preferably, the polyether selects one or a copolymer of any combination of single-ended polyethylene glycol, single-ended ethylene oxide homopolymer, single-ended propylene oxide homopolymer, single-ended tetrahydrofuran homopolymer and single-ended long chain alkane homopolymer Further, in the preparation method for the polyether derivative, preferably, in the aryl compound containing isocyanate, the aryl group is selected from any one of

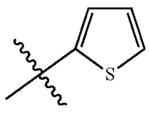, 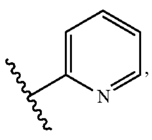, 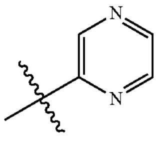,

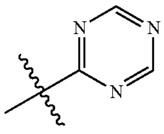

and

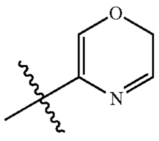

The polyether derivative of the present invention modifies the polyether and introduces the functional group into the polyether chain, such that the derivative has an ether bond, an ester group, an amino group, a heteroatom, and other groups. Therefore, because the derivative has no terminal hydroxyl group, the problems of poor high temperature stability and poor anti-oxidation are solved, enabling the derivative to have various functions such as anti-oxidation, anti-wear functionality, and anti-rust functionality, either without requiring additional additives or requiring fewer additional additives used to make up for the lack of base oil functions. Due to difference of modifying groups, the polyether derivative has relatively prominent functions on the basis of having multiple functions at the same time.

DETAILED DESCRIPTION

To understand technical features, purpose and effects of the present invention more clearly, specific embodiments of the present invention are described in detail.

Embodiments 1-12 describe the first polyether derivative which has more prominent anti-rust functionality.

Embodiment 1 A polyether derivative is a compound with the following structure:

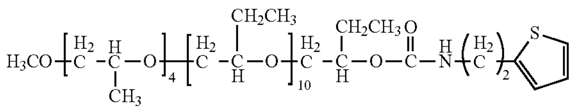

The above polyether derivative is prepared by a method with the following steps:

A. weighing raw materials: 40 parts of polyether

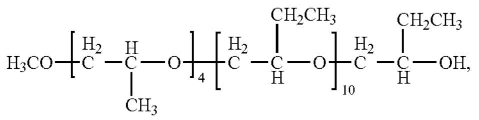

40 parts of aryl compound containing isocyanate

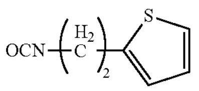

and 0.5 part of diluent; the diluent is composed of dichloromethane and tetrahydrofuran with a mass ratio 10:1;

B. dissolving the aryl compound containing isocyanate into the diluent to obtain solution 1; dropwise adding the solution 1 to a reaction vessel containing polyether at temperature of 50° C. and at a rate of 0.1 mL/min; and after dropwise adding, continuing the stirring for 20 min;

C. heating the reaction vessel to 60° C.; and aging for 1 hour to obtain the product of embodiment 1.

Embodiment 2 A polyether derivative is a compound with the following structure:

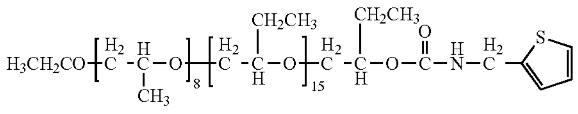

The above polyether derivative is prepared by a method with the following steps:

A. weighing raw materials: 40 parts of polyether

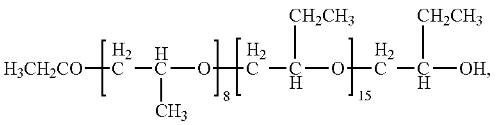

50 parts of aryl compound containing isocyanate

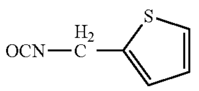

and 1 part of diluent; the diluent is composed of dichloromethane and furan with a mass ratio 10:3.

B. dissolving the aryl compound containing isocyanate into the diluent to obtain solution 1; dropwise adding the solution 1 to a reaction vessel containing poly-ether at temperature of 60° C. and at a rate of 2 mL/min; and after dropwise adding, continuing the stirring for 40 min;

C. heating the reaction vessel to 90° C.; and aging for 2 hours to obtain the product of embodiment 2.

Embodiment 3 A polyether derivative is a compound with the following structure:

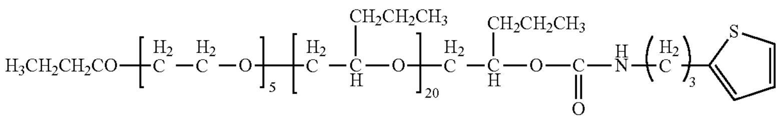

The above polyether derivative is prepared by a method with the following steps:

A. weighing raw materials: 60 parts of polyether

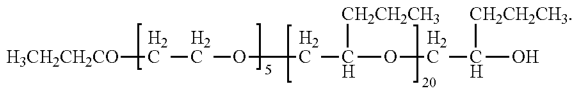

60 parts of aryl compound containing isocyanate

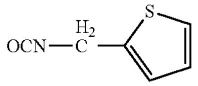

and 2 parts of diluent; the diluent is composed of trichloromethane and furan with a mass ratio 15:5;

B. dissolving the aryl compound containing isocyanate into the diluent to obtain solution 1; dropwise adding the solution 1 to a reaction vessel containing polyether at temperature of 55° C. and at a rate of 1.5 mL/min; and after dropwise adding, continuing the stirring for 30 min;

C. heating the reaction vessel to 70° C.; and aging for 1.5 hours to obtain the product of embodiment 3.

Embodiment 4 A polyether derivative is a compound with the following structure:

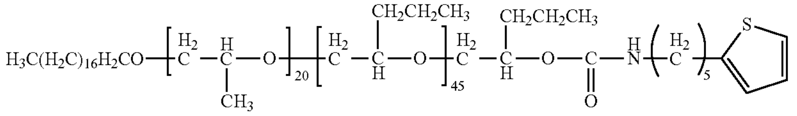

The above polyether derivative is prepared by a method with the following steps:

A. weighing raw materials: 70 parts of polyether

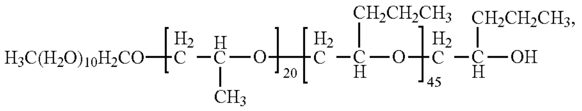

70 parts of aryl compound containing isocyanate

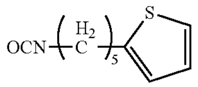

and 3 parts of diluent; the diluent is composed of tetrachloromethane and pyridine with a mass ratio 20:5;

B. dissolving the aryl compound containing isocyanate into the diluent to obtain solution 1; dropwise adding the solution 1 to a reaction vessel containing polyether at temperature of 60° C. and at a rate of 2 mL/min; and after dropwise adding, continuing the stirring for 20 min;

C. heating the reaction vessel to 80° C.; and aging for 1 hour to obtain the product of embodiment 4.

Embodiment 5 A polyether derivative is a compound with the following structure:

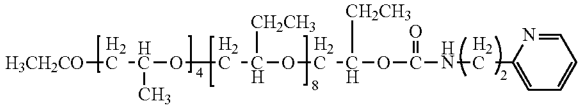

The above polyether derivative is prepared by a method with the following steps:

A. weighing raw materials: 55 parts of polyether

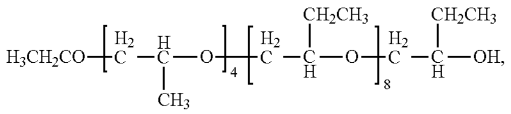

60 parts of aryl compound containing isocyanate

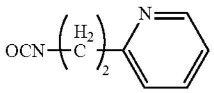

and 2 parts of diluent: the diluent is composed of tetrachloromethane and pyrazine with a mass ratio 20:3;

B. dissolving the aryl compound containing isocyanate into the diluent to obtain solution 1; dropwise adding the solution 1 to a reaction vessel containing polyether at temperature of 50° C. and at a rate of 1.5 mL/min; and after dropwise adding, continuing the stirring for 30 min;

C. heating the reaction vessel to 86° C.; and aging for 1.5 hours to obtain the product of embodiment 5.

Embodiment 6 A polyether derivative is a compound with the following structure:

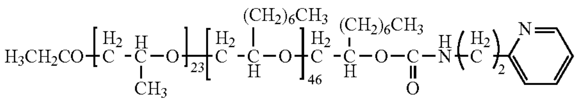

The above polyether derivative is prepared by a method with the following steps:

A. weighing raw materials: 55 parts of polyether

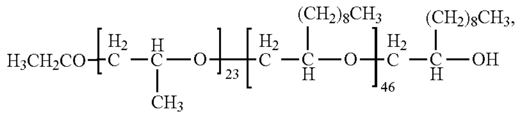

70 parts of aryl compound containing isocyanate

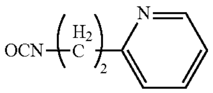

and 1 part of diluent; the diluent is composed of dichloromethane and pyrrole with a mass ratio 20:1;

B. dissolving the aryl compound containing isocyanate into the diluent to obtain solution 1; dropwise adding the solution 1 to a reaction vessel containing polyether at temperature of 55° C. and at a rate of 2 mL/min; and after dropwise adding, continuing the stirring for 40 min;

C. heating the reaction vessel to 75° C.; and aging for 2 hours to obtain the product of embodiment 6.

Embodiment 7 A polyether derivative is a compound with the following structure:

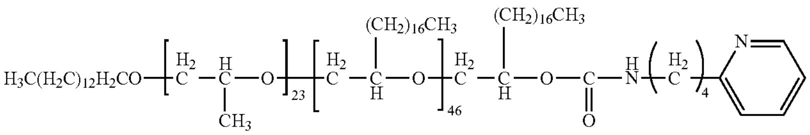

The preparation steps of the polyether derivative in the present embodiment are the same as those of any one of embodiments 1-6. Raw materials are selected: 45 parts of polyether

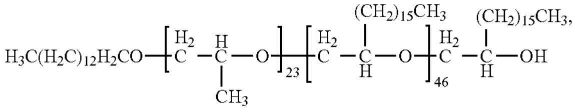

50 parts of aryl compound containing isocyanate

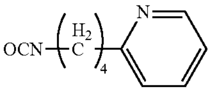

and 2 parts of diluent (which is composed of dichioromethane and pyrrole with a mass ratio of 20:2).

Embodiment 8 A polyether derivative is a compound with the following structure:

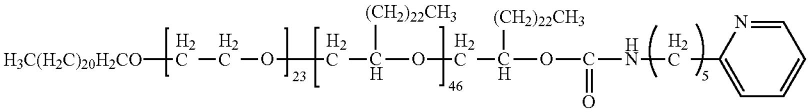

The preparation steps of the polyether derivative in the present embodiment are the same as those of any one of embodiments 1-6. Raw materials are selected: 55 parts of polyether

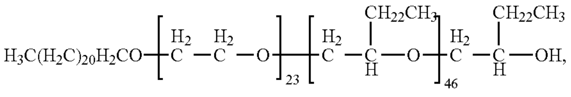

60 parts of aryl compound containing isocyanate

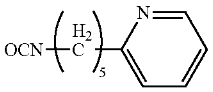

and 3 parts of diluent (which is composed of trichlorethane and furan with a mass ratio of 20:6).

Embodiment 9 A polyether derivative is a compound with the following structure:

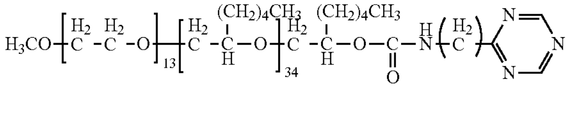

The preparation steps of the polyether derivative in the present embodiment are the same as those of any one of embodiments 1-6. Raw materials are selected: 65 parts of polyether

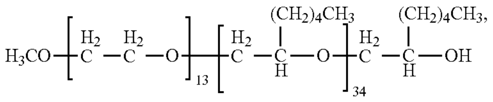

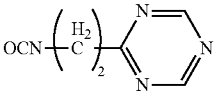

and 0.5 part of diluent (which is composed of tetrachloromethane and furan with a mass ratio of 15:6).

Embodiment 10 A polyether derivative is a compound with the following structure:

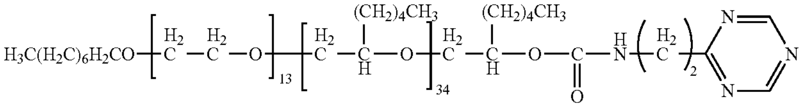

The preparation steps of the polyether derivative in the present embodiment are the same as those of any one of embodiments 1-6. Raw materials are selected: 65 parts of polyether

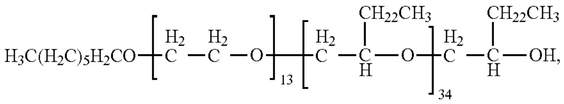

70 parts of aryl compound containing isocyanate

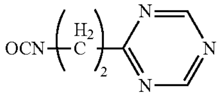

and 1.5 parts of diluent (which is composed of dichloromethane and furan with a mass ratio of 15:7).

Embodiment 11 A polyether derivative is a compound with the following structure:

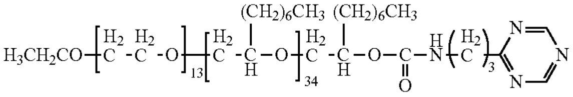

The preparation steps of the polyether derivative in the present embodiment are the same as those of any one of embodiments 1-6. Raw materials are selected: 70 parts of polyether

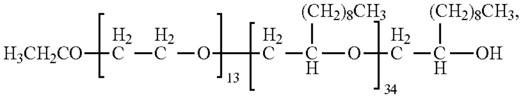

70 parts of aryl compound containing isocyanate

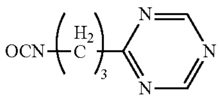

and 2.5 parts of diluent (which is composed of dichloromethane and pyrrole with a mass ratio of 15:9).

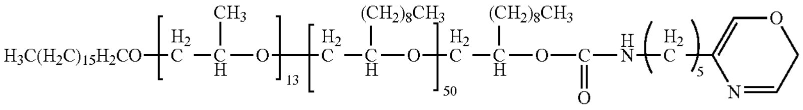

The preparation steps of the polyether derivative in the present embodiment are the same as those of any one of embodiments 1-6. Raw materials are selected: 40 parts of polyether

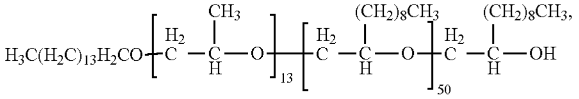

40 parts of aryl compound containing isocyanante

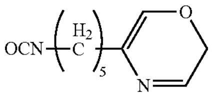

and 2 parts of diluent (which is composed of trichloromethane and tetrahydrofuran with a mass ratio of 15:9).

In embodiments 1-12, due to the modifying groups, the above embodiments have more prominent anti-rust functionality on the basis of having the functions such as anti-wear functionality, anti-rust functionality and anti-oxidation. The anti-rust functionality of the above embodiments is explained below through contrast experiments.

Contrast experiments: the existing frequently-used anti-rust agents such as barium petroleum sulfonate (T 701), dodecenyl succinic acid and dodecenyl succinate monoester are selected as contrast anti-rust agents for conducting copper corrosion experiments and salt spray box experiments to test the anti-corrosion functionality of the compound of the present invention and the existing anti-rust agents.

1. Copper corrosion experiment: the experiment is conducted at 100° C. by GB/T 5096. The smaller the result digit is, the better the anti-corrosion effect is.

2. Salt spray box experiment: experimental conditions are: 150 SN is used as base oil, and the addition amount of an additive is 1%. The larger the result digit is, the better the anti-corrosion effect is.

3. Anti-oxidation experiment: GM 6137-M test K.

4. High temperature stability experiment: decomposition temperature is detected by heating.

Detection result

| | Copper Corrosion Experiment | Salt Spray Box Experiment (Salt Spray Resistance Period) (h) | Anti-oxidation Experiment (GM 6137-M Test K) | High Temperature Stability (Thermogravimetry); Decomposition Temperature (° C.) |
|---|---|---|---|---|
| Embodiment 1 | 1a | 20 | Passed | 380 |
| Embodiment 2 | 1a | 24 | Passed | 395 |
| Embodiment 3 | 1a | 24 | Passed | 396 |
| Embodiment 4 | 1a | 22 | Passed | 398 |
| Embodiment 5 | 1a | 24 | Passed | 400 |
| Embodiment 6 | 1a | 24 | Passed | 399 |
| Embodiment 7 | 1a | 24 | Passed | 395 |
| Embodiment 8 | 1a | 24 | Passed | 402 |
| Embodiment 9 | 1a | 21 | Passed | 396 |
| Embodiment 10 | 1a | 22 | Passed | 391 |
| Embodiment 11 | 1a | 24 | Passed | 398 |
| Embodiment 12 | 1a | 24 | Passed | 400 |
| Barium petroleum sulfonate (T701) | 2a | 4.5 | Failed | 200 |
| Dodecenyl succinic acid | 2a | 2.2 | Failed | 301 |
| Dodecenyl succinate monoester | 2b | 2.3 | Failed | 325 |

It can be seen from the above table that the anti-rust functionality of the compound of the present invention is better than the functionality of the prior art. The anti-oxidation capability and the high temperature stability am much better than those of the existing anti-rust agents.

Embodiments 13-22 describe the second polyether derivative which has more prominent anti-oxidation functionality.

Embodiment 13 A polyether derivative is a compound with the following structure:

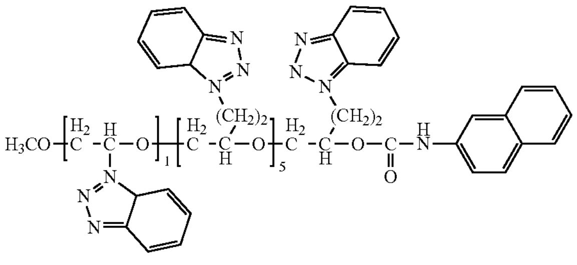

The above polyether derivative is prepared by a method with the following steps:

A. weighing raw materials: 40 parts of chlorocycloethane and chlorocyclopropane (the molar ratio of chlorocycloethane and chlorocyclopropane is 1:6), 20 ppm of bimetallic catalyst (Zn—Co bimetallic catalyst), 0.1 part of methanol, 40 parts of benzotriazole (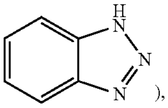), and 0.5 part of diluent; the diluent is composed of dichloromethane and tetrahydrofuran with a mass ratio 10:1; 40 parts of isocyanate compound

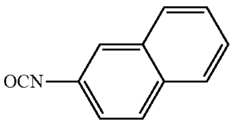;

B. adding the catalyst to a dry reactor protected by inert gas, and then adding the initiator methanol and chlorocycloethane; heating the reactor to 30° C.; maintaining pressure to be less than 1.5 MPa; when the temperature starts to rise and the pressure starts to drop, starting the reaction and continuously adding chlorocyclopropane to the reactor at a rate of 0.5 mL/min; continuing the aging for 1 hour; stopping the heating and cooling the reactor to room temperature; and filtering to obtain polyether;

C. heating a reaction vessel with polyether to 50° C.; slowly adding benzotriazole into the vessel; raising the temperature and keeping reaction temperature at 100° C. to react for 1 hour; and at the end of the reaction, obtaining compound 1 with hydroxyl at an end and benzotriazole in a main chain;

D. dissolving the isocyanate compound into the diluent to form solution 1; dropwise adding the solution 1 to a vessel containing compound 1 at temperature of 50 and at a rate of 0.1 mL/min; and after dropwise adding, continuing the stirring for 20 min;

E. heating the reaction vessel to 60° C.; and aging for 1 hour to obtain the product of embodiment 13.

Embodiment 14 A polyether derivative is a compound with the following structure:

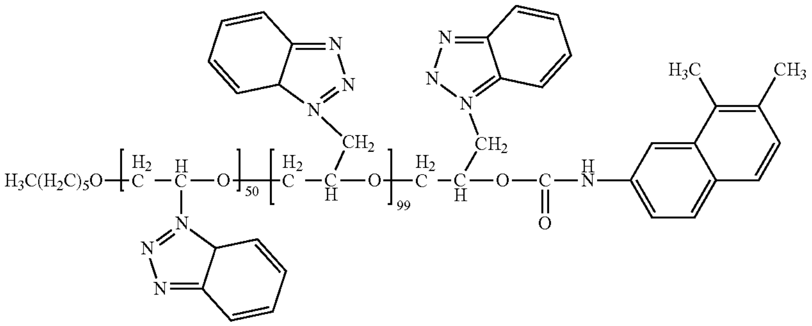

The above polyether derivative is prepared by a method with the following steps:

A. weighing raw materials: 50 parts of chlorocycloethane and chlorocyclopropane (the molar ratio of chlorocycloethane and chlorocyclopropane is 1:2), 100 ppm of bimetallic catalyst 10 parts of hexyl alcohol, 50 parts of methylbenzotriazole; 1 part of diluent; the diluent is composed of dichloromethane and furan with a mass ratio 10:3; 40 parts of isocyanate compound

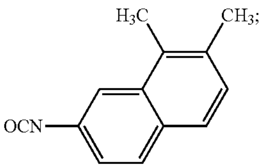

B. adding the catalyst to a dry reactor protected by inert gas, and then adding the initiator hexyl alcohol and chlorocycloethane, with the molar ratio of the initiator and chlorocycloethane as 0.1:1-1:5; heating the reactor to 30-100° C.; maintaining pressure to be less than 1.5 MPa; when the temperature starts to rise and the pressure starts to drop, continuously adding chlorocyclopropane to the reactor at a rate of 0.5-3 mL/min; continuing the aging for 3 hours; stopping the heating and cooling the reactor to room temperature; and filtering to obtain polyether.

C. heating a reaction vessel with polyether to 80° C. slowly adding methylbenzotriazole into the vessel; raising the temperature and keeping reaction temperature at 120° C. to react for 12 hours; and at the end of the reaction, obtaining compound 1 with hydroxyl at an end and benzotriazole in a main chain;

D. dissolving the isocyanate compound into the diluent to form solution 1; dropwise adding the solution 1 to a vessel containing compound 1 at temperature of 60° C. and at a rate of 2 mL/min; and after dropwise adding, continuing the stirring for 20 min;

E. heating the reaction vessel to 90° C.; and aging for 2 hours to obtain the product of embodiment 14.

Embodiment 15 A polyether derivative is a compound with the following structure:

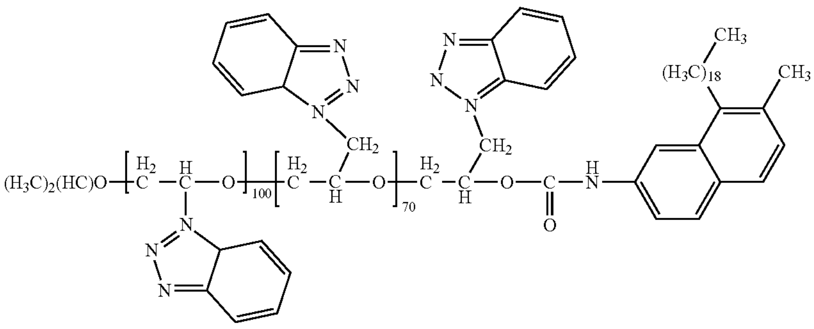

The above polyether derivative is prepared by a method with the following steps:

A. weighing raw materials: 50 parts of chlorocycloethane and chlorocyclopropane (the molar ratio of chlorocycloethane and chlorocyclopropane is 100:71), 30 ppm of potassium hydroxide catalyst, 1 part of hexyl alcohol, 50 parts of benzotriazole: 10 parts of isopropyl alcohol; 2 pans of diluent; the diluent is composed of trichloromethane and furan with a mass ratio 15:5; 40 parts of isocyanate compound

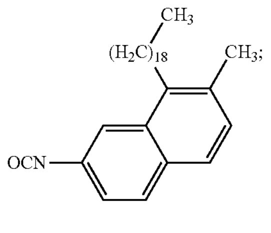

B. adding the potassium hydroxide catalyst to a dry reactor protected by inert gas, and then adding hexyl alcohol and chlorocycloethane; heating the reactor to 50° C.; maintaining pressure to be less than 1.5 MPa; when the temperature starts to rise and the pressure starts to drop, starting the reaction and continuously adding chlorocyclopropane to the reactor at a rate of 2.5 mL/min; continuing the aging for 3 hours; stopping the heating and cooling the reactor to room temperature; and filtering to obtain polyether;

C. heating a reaction vessel with polyether to 70° C.; slowly adding benzotriazole into the vessel; raising the temperature and keeping reaction temperature at 110° C. to react for 10 hours; and at the end of the reaction, obtaining compound a with hydroxyl at an end and benzotriazole in a main chain;

D. dissolving the isocyanate compound into the diluent to form solution 1; dropwise adding the solution 1 to a vessel containing compound 1 at temperature of 55° C. and at a rate of 1.5 mL/min; and after dropwise adding, continuing the stirring for 30 min;

E. heating the reaction vessel to 70° C.; and aging for 1.5 hours to obtain the product of embodiment 15.

Embodiment 16 A polyether derivative is a compound with the following structure:

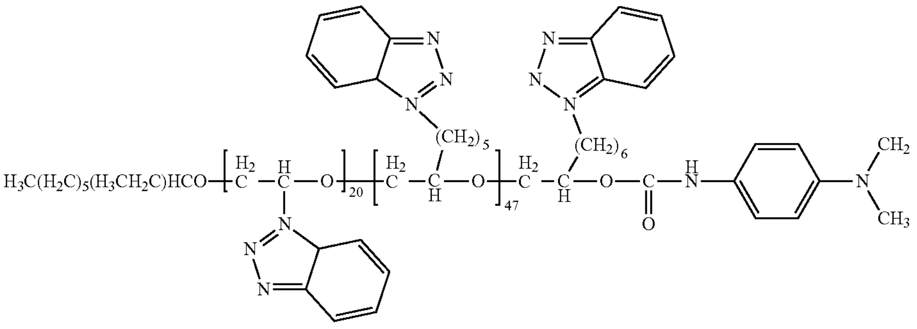

A. weighing raw materials: 50 parts of chlorocycloethane and chlorocyclooctane (the molar ratio of chlorocycloethane and chlorocyclooctane is 20:48), 50 ppm of sodium hydroxide catalyst, 7 parts of nonyl-3-alcohol, 50 parts of benzotriazole; 3 parts of diluent; the diluent is composed of tetrachloromethane and pyridine with a mass ratio 20:5; 40 parts of isocyanate compound

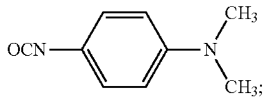

B. adding the sodium hydroxide catalyst to a dry reactor protected by inert gas, and then adding nonyl-3-alcohol and chlorocycloethane; heating the reactor to 60° C.; maintaining pressure to be less than 1.5 MPa; when the temperature starts to rise and the pressure starts to drop, starting the reaction and continuously adding chlorocyclooctane to the reactor at a rate of 1 mL/min; continuing the aging for 1.5 hours; stopping the heating and cooling the reactor to room temperature; and filtering to obtain polyether;

C. heating a reaction vessel with polyether to 60° C.; slowly adding benzotriazole into the vessel; raising the temperature and keeping reaction temperature at 110° C. to react for 6 hours; and at the end of the reaction, obtaining compound 1 with hydroxyl at an end and benzotriazole in a main chain;

D. dissolving the isocyanate compound into the diluent to form solution 1; dropwise adding the solution 1 to a vessel containing compound 1 at temperature of 60° C. and at a rate of 2 mL/min; and after dropwise adding, continuing the stirring for 20 min;

E. heating the reaction vessel to 8° C.; and aging for 1 hour to obtain the product of embodiment 16.

Embodiment 17 A polyether derivative is a compound with the following structure:

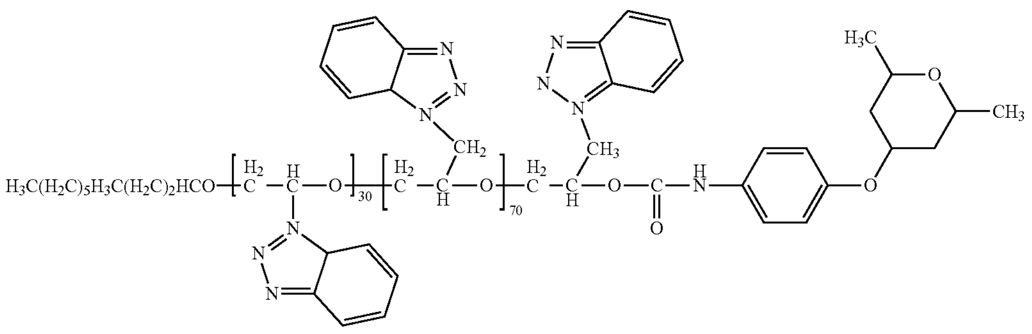

The preparation steps of the polyether derivative in the present embodiment are the same as those of embodiment 13. Raw materials are selected: 45 parts of chlorocycloethane and chlorocyclopropane (the molar ratio of chlorocycloethane and chlorocyclopropane is 30:71), 60 ppm of sodium hydroxide catalyst, 7 parts of decyl-4-alcohol, 45 parts of benzotriazole, 2 parts of diluent; the diluent is composed of tetrachloromethane and pyrazine with a mass ratio of 20:3; 45 parts of isocyanate compound

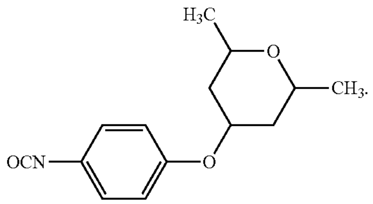

Embodiment 18 A polyether derivative is a compound with the following structure:

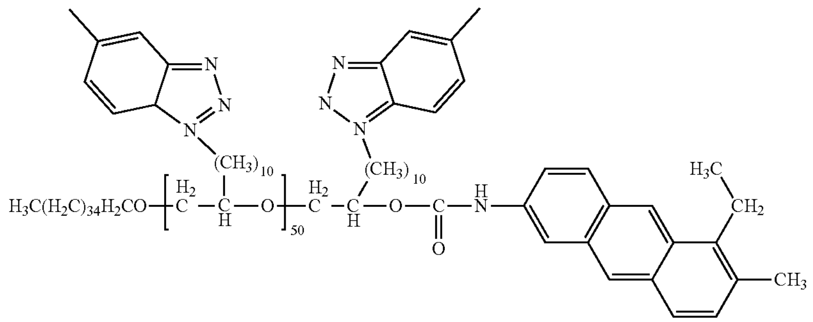

The preparation steps of the polyether derivative in the present embodiment are the same as those of embodiment 13. Raw materials are selected: 50 parts of chlorocyclododecane, 70 ppm of bimetallic catalyst, 8 pans of n-hexadecyl alcohol, 50 parts of methylbenzotriazole; 1 part of diluent; the diluent is composed of dichloromethane and pyrrole with a mass ratio 20:1; and 50 parts of isocyanate compound

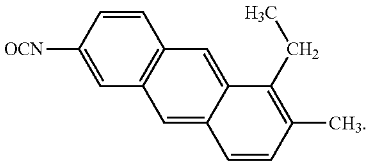

Embodiment 19 A polyether derivative is a compound with the following structure:

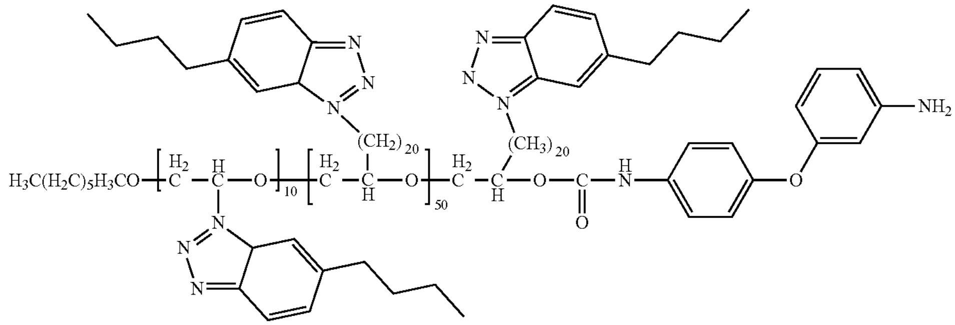

The preparation steps of the polyether derivative in the present embodiment are the same as those of embodiment 14. Raw materials are selected: 50 parts of chlorocycloethane and chlorcyclodocosane (the molar ratio of chlorocycloethane and chlorcyclodocosane is 10:51), 100 ppm of bimetallic catalyst, 8 parts of n-heptanol, 50 parts of butylbenzothiazole: 1 part of diluent; the diluent is composed of dichloromethane and pyrrole with a mass ratio 20:1; and 50 parts of isocyanate compound

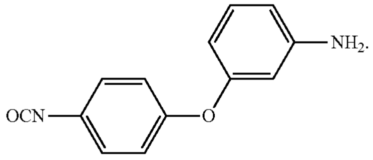

Embodiment 20 A polyether derivative is a compound with the following structure:

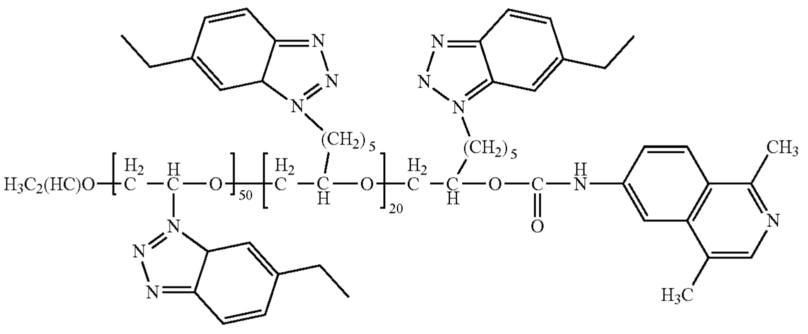

The preparation steps of the polyether derivative in the present embodiment are the same as those of embodiment 15. Raw materials are selected: 60 parts of chlorocycloethane and chlorocycloheptane (the molar ratio of chlorocycloethane and chlorocycloheptane is 50:21), 60 ppm of bimetallic catalyst, 7 parts of isopropyl alcohol, 60 parts of ethylbenzotriazole; 2 parts of diluent (the mass ratio of dichloromethane and pyrrole is 20:2); and 50 parts of isocyanate compound

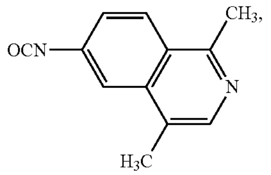

Embodiment 21 A polyether derivative is a compound with the following structure:

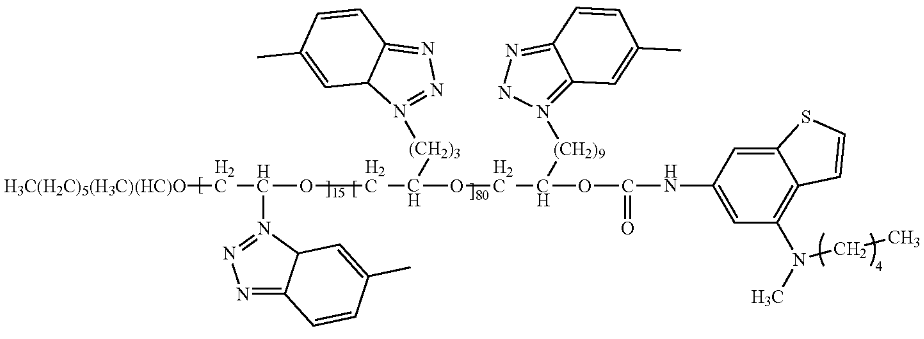

The preparation steps of the polyether derivative in the present embodiment are the same as those of embodiment 15. Raw materials are selected: 60 parts of chlorocycloethane and chlorocyclododecane (the molar ratio of chlorocycloethane and chlorocycloundecane is 15:81), 60 ppm of sodium hydroxide catalyst 8 parts of heptyl-2-alcohol, 50 parts of methylbenzotriazole; 3 parts of diluent (the mass ratio of trichloromethane and furan is 20:6); and 60 parts of isocyanate compound

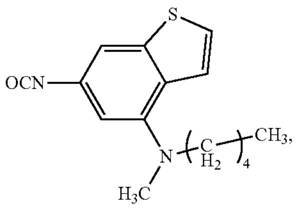

Embodiment 22 A polyether derivative is a compound with the following structure:

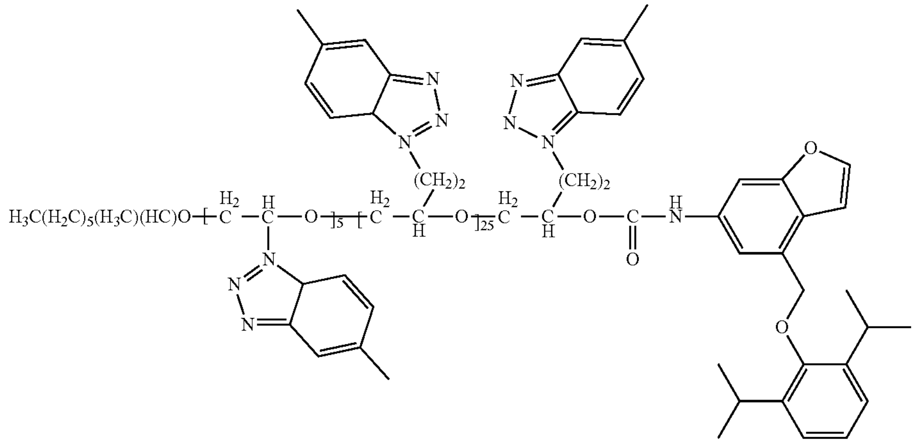

The preparation steps of the polyether derivative in the present embodiment are the same as those of embodiment 15. Raw materials are selected: 60 parts of chlorocycloethane and chlorocyclobutane (the molar ratio of chlorocycloethane and chlorocyclobutane is 5:26), 50 ppm of sodium hydroxide catalyst, 1 part of decyl-3-alcohol, 60 parts of methylbenzotriazole; 0.5 pan of diluent (the mass ratio of tetrachloromethane and furan is 15:6); and 60 parts of isocyanate compound

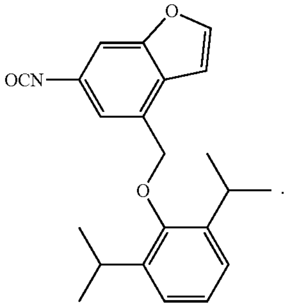

In embodiments 13-22, due to the modifying groups, the above embodiments have more prominent anti-oxidation functionality on the basis of having the functions such as anti-wear functionality, anti-rust functionality and anti-oxidation. The anti-oxidation functionality of the above embodiments is explained below through contrast experiments, Contrast Experiment:

The existing frequently-used antioxidants such as zinc dialkyl dithiophosphate (ZDDP), dialkyl dithiocarbamate (ADTC) and dialkyl dithiophosphate (ADDP) are selected as contrast antioxidants.

1. Pressure differential scanning calorimetry (PDSC) experiment: The oxidation induction time of lubricating oil is determined according to the standard test method of ASTM D6186-1998 using pressure differential scanning calorimetry (PDSC). 3.0 mg of samples at pressure of 3.5 MPa and 210° C. are used.

2. Oxidation experiment of rotating pressure container: the anti-oxidation characteristics of the compound of the present invention and the existing antioxidants are determined and inspected according to national standard ASTM 132272-2009 Determination Method for Oxidation Stability of Lubricating Oil. The longer the time is, the better the anti-oxidation effect is.

3. Copper corrosion experiment: The anti-corrosion functionality of the compound of the present invention and the existing antioxidants is determined and inspected according to GB 5096-2017 Copper Corrosion Test Method for Liquified Petroleum Gas. The smaller the result digit of the copper corrosion experiment is, the better the anti-corrosion effect is.

4. Cleanliness test: Determination is made according to SH/T 0269-1992 Determination Method for Cleanliness of Lubricating Oil of Internal Combustion Engine. The results include seven levels from 0 to 6. 0 represents the cleanest and lightest, and 6 represents the dirtiest and darkest. The smaller the digit is, the better the cleanliness is.

| Detection result | | | | |
|---|---|---|---|---|
| | PDSC (Pressure Differential Scanning: Calorimetry) (time of the inflection point, min) | Oxidation Experiment of Rotating Pressure Container (min) | Copper Corrosion Experiment (100° C.) | Cleanliness Experiment |
| Embodiment 13 | 42 | 672 | 1a | 1 |
| Embodiment 14 | 38.5 | 664 | 1a | 1 |
| Embodiment 15 | 39.5 | 687 | 1a | 1 |
| Embodiment 16 | 40.9 | 678 | 1a | 1 |
| Embodiment 17 | 41.5 | 652 | 1a | 1 |
| Embodiment 18 | 42.5 | 661 | 1a | 1 |

-continued

| Detection result | | | | |
|---|---|---|---|---|
| | PDSC (Pressure Differential Scanning: Calorimetry) (time of the inflection point, min) | Oxidation Experiment of Rotating Pressure Container (min) | Copper Corrosion Experiment (100° C.) | Cleanliness Experiment |
| Embodiment 19 | 43 | 657 | 1a | 1 |
| Embodiment 20 | 39.8 | 659 | 1a | 1 |
| Embodiment 21 | 39.9 | 669 | 1a | 1 |
| Embodiment 22 | 41.6 | 683 | 1a | 1 |
| Zinc dialkyl dithiophosphate | 10 | 321 | 2b | 5 |
| Dialkyl dithiocarbamate | 15 | 158 | 2b | 6 |
| Dialkyl dithiophosphate | 13.5 | 259 | 2b | 6 |

It can be seen from the table that the anti-oxidation of the compound of the present invention is better than that of the traditional antioxidant, which proves that the polyether derivative of the present invention has excellent anti-oxidation effect, and also has better anti-corrosion and cleanliness properties.

Embodiments 23-37 describe the third polyether derivative which has more prominent anti-wear functionality.

Embodiment 23 A polyether derivative is a compound with the following structure:

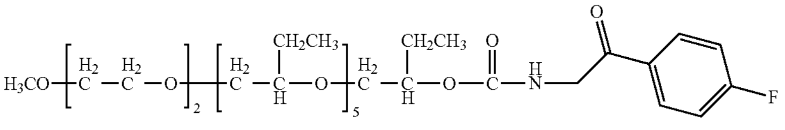

The above polyether derivative is prepared by a method with the following steps:

A. weighing raw materials: 50 parts of polyether

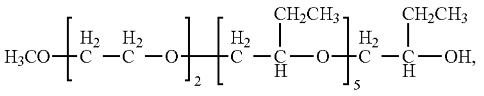

50 parts of carbonyl compound containing isocyanate

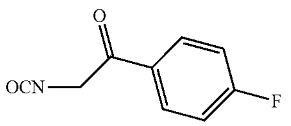

and 3 parts of diluent (selected from a mixture of toluene and dichloromethane): the mass ratio of toluene and dichloromethane is 5:1;

B. dissolving the carbonyl compound containing isocyanate into the diluent; keeping the temperature at 40° C.; and stirring for 20 minutes to prepare solution 1;

C. dropwise adding the solution 1 to the polyether at a rate of 0.1 mL/min; after dropwise adding, raising the temperature to 85° C.; and aging for 1.5 hours to obtain the product of embodiment 23.

Embodiment 24 A polyether derivative is a compound with the following structure:

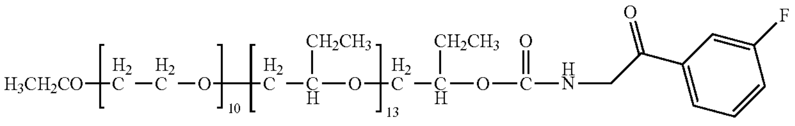

The above polyether derivative is prepared by a method with the following steps:

A. weighing raw materials: 40 parts of polyether

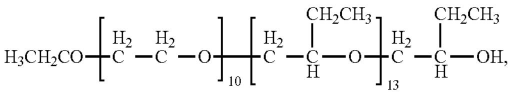

70 parts of carbonyl compound containing isocyanate

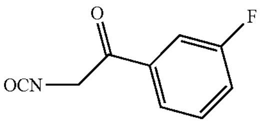

and 2 parts of diluent (selected from a mixture of toluene and trichloromethane); the mass ratio of toluene and trichloromethane is 6:3;

B. dissolving the carbonyl compound containing isocyanate into the diluent; keeping the temperature at 45° C.; and stirring for 30 minutes to prepare solution 1;

C. dropwise adding the solution 1 to the polyether at a rate of 0.5 mL/min; after dropwise adding, raising the temperature to 90° C.; and aging for 1.7 hours to obtain the product of embodiment 24.

Embodiment 25 A polyether derivative is a compound with the following structure:

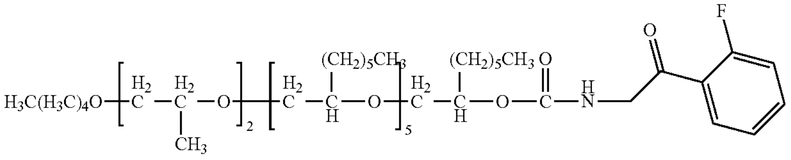

The above polyether derivative is prepared by a method with the following steps:

A. weighing raw materials: 45 parts of polyether

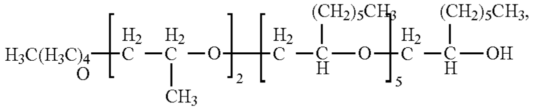

40 parts of carbonyl compound containing isocyanate

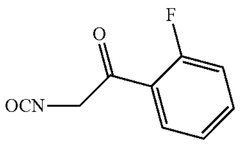

and 1 part of diluent (selected from a mixture of xylene and dichloromethane): the mass ratio of xylene and dichloromethane is 10:3;

B. dissolving the carbonyl compound containing isocyanate into the diluent; keeping the temperature at 50° C.; and stirring tor 40 minutes to prepare solution 1;

C. dropwise adding the solution 1 to the polyether at a rate of 1 mL/min; after dropwise adding, keeping the temperature to 50° C.; and aging for 2 hours to obtain the product of embodiment 25.

Embodiment 26 A polyether derivative is a compound with the following structure:

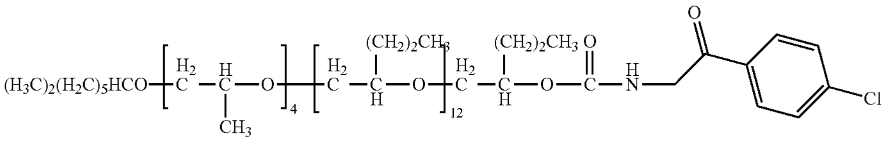

The preparation steps of the polyether derivative in the present embodiment are the same as those of embodiment 23. Raw materials are selected: 42 parts of polyether

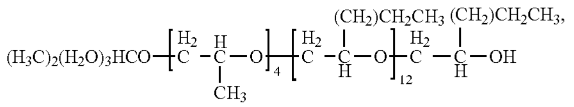

60 parts of carbonyl compound containing isocyanate

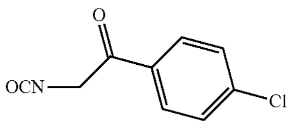

and 2.5 parts of diluent (selected from a mixture of mesitylene and dichloromethane); the mass ratio of mesitylene and dichloromethane is 10:4;

Embodiment 27 A polyether derivative is a compound with the following structure:

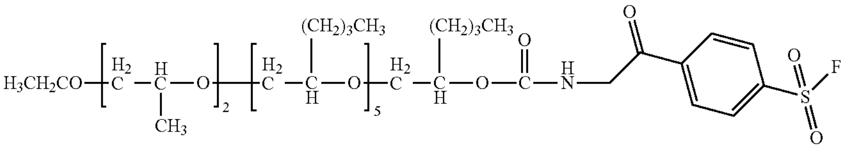

The preparation steps of the polyether derivative in the present embodiment are the same as those of embodiment 24. Raw materials are selected: 46 parts of polyether

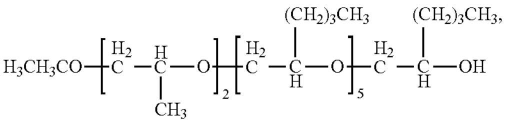

45 parts of carbonyl compound containing isocyanate

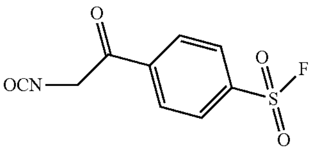

and 1.5 parts of diluent (selected from a mixture of mesitylene and tetrachloromethane); the mass ratio of mesitylene and tetrachloromethane is 6:1.

Embodiment 28 A polyether derivative is a compound with the following structure:

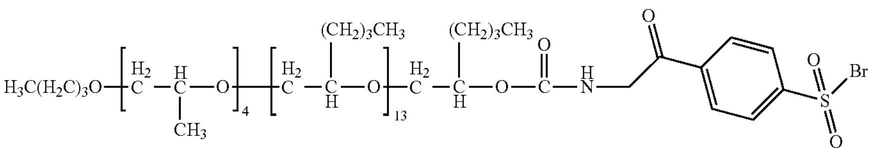

The preparation steps of the polyether derivative in the present embodiment are the same as those of embodiment 23. Raw materials are selected: 49 parts of polyether

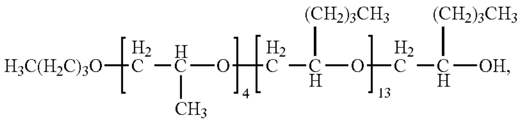

65 parts of carbonyl compound containing isocyanate

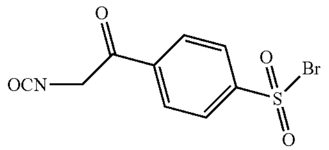

and 1.5 parts of diluent (selected from a mixture of xylene and dichloromethane); the mass ratio of xylene and dichloromethane is 7:1.

Embodiment 29 A polyether derivative is a compound with the following structure:

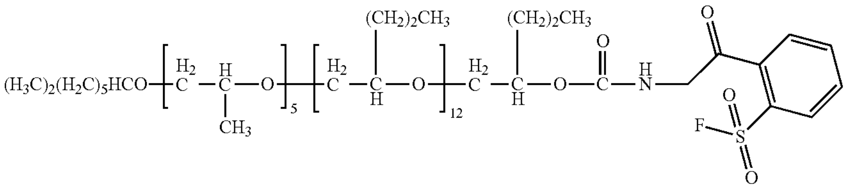

The preparation steps of the polyether derivative in the present embodiment are the same as those of embodiment 23. Raw materials are selected: 43 parts of polyether

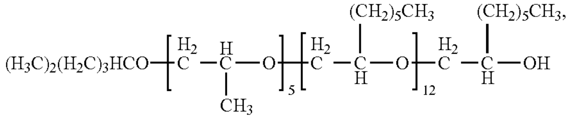

55 parts of carbonyl compound containing isocyanate

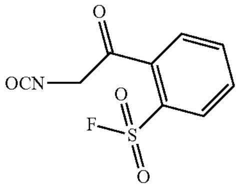

and 1.8 parts of diluent (selected from a mixture of mesitylene and trichloromethane); the mass ratio of mesitylene and trichloromethane is 8:1.

Embodiment 30 A polyether derivative is a compound with the following structure:

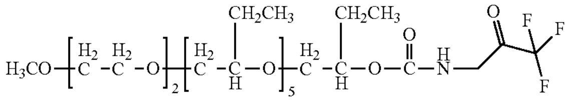

The preparation steps of the polyether derivative in the present embodiment are the same as those of embodiment 23. Raw materials are selected: 44 pans of polyether

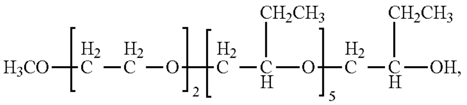

52 parts of carbonyl compound containing isocyanate

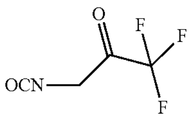

and 2.8 parts of dilutent (selected from a mixture of toluene and trichloromethane); the mass ratio of toluene and trichloromethane is 9:1.

Embodiment 31 A polyether derivative is a compound with the following structure:

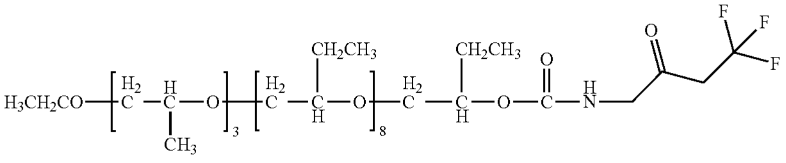

The preparation steps of the polyether derivative in the present embodiment are the same as those of embodiment 23. Raw materials are selected: 47 parts of polyether

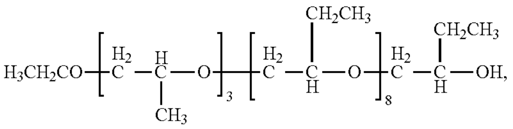

58 pars of carbonyl compound containing isocyanate

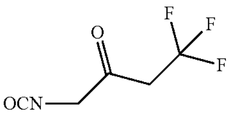

and 1.8 parts of diluent (selected from a mixture of xylene and dichloromethane); the mass ratio of xylene and dichloromethane is 10:1.

Embodiment 32 A polyether derivative is a compound with the following structure:

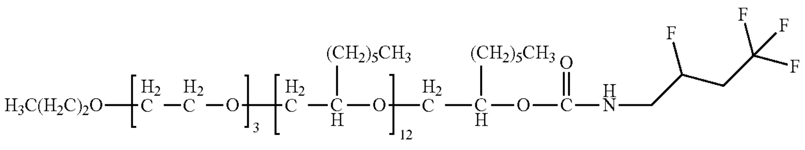

The preparation steps, of the polyether derivative in the present embodiment are the same as those of embodiment 23. Raw materials are selected: 41 parts of polyether

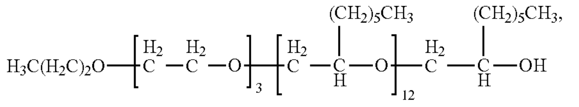

59 parts of carbonyl compound containing isocyanate

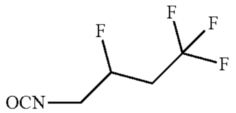

and 2.8 parts of diluent (selected from a mixture of toluene and tetrachloro)methane): the mass ratio of toluene and tetrachloromethane is 10:4.

Embodiment 33 A polyether derivative is a compound with the following structure:

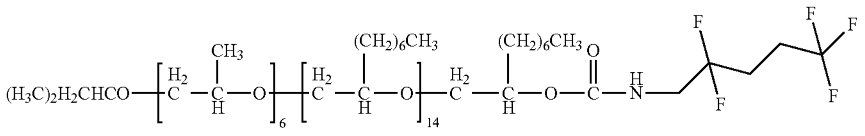

The preparation steps of the polyether derivative in the present embodiment are the same as those of embodiment 23. Raw materials are selected: 43 parts of polyether

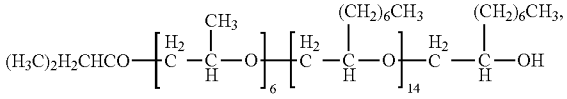

47 parts of carbonyl compound containing isocyanate

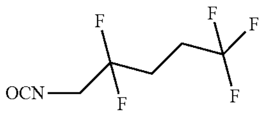

and 2.2 parts of diluent (selected from a mixture of mesitylene and dichloromethane); the mass ratio of mesitylene and dichloromethane is 7:3.

Embodiment 34 A polyether derivative is a compound with the following structure:

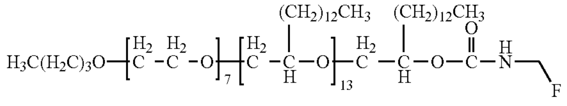

The preparation steps of the polyether derivative in the present embodiment are the same as those of embodiment 23. Raw materials are selected: 48 parts of polyether

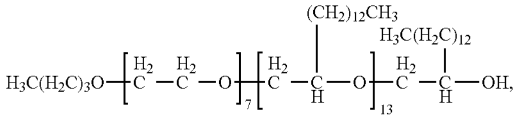

51 parts of carbonyl compound containing isocyanate

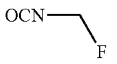

and 2.5 parts of diluent (selected from a mixture of toluene and dichloromethane): the mass ratio of toluene and dichloromethane is 5:1.

Embodiment 35 A polyether derivative is a compound with the following structure:

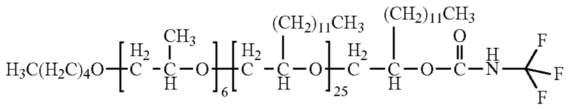

The preparation steps of the polyether derivative in the present embodiment are the same as those of embodiment 23. Raw materials are selected: 46 parts of polyether

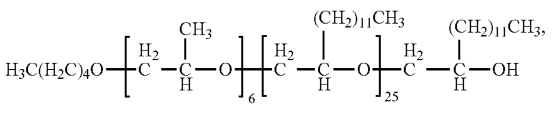

62 parts of carbonyl compound containing isocyanate

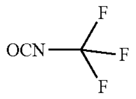

and 2.5 parts of diluent (selected from a mixture of toluene and trichloromethane); the mass ratio of toluene and trichloromethane is 7:2.

Embodiment 36 A polyether derivative is a compound with the following structure:

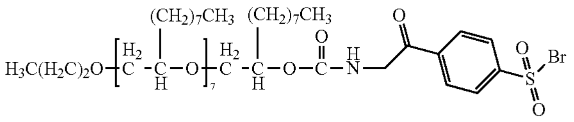

The preparation steps of the polyether derivative in the present embodiment are the same as those of embodiment 23. Raw materials are selected: 46 parts of polyether

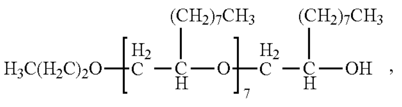

53 parts of carbonyl compound containing isocyanate

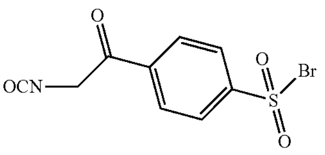

and 2 parts of diluent (selected from a mixture of toluene and tetrachloromethane): the mass ratio of toluene and tetrachloromethane is 8:3.

Embodiment 37 A polyether derivative is a compound with the following structure:

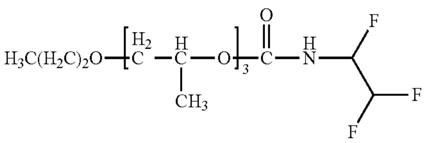

The preparation steps of the polyether derivative in the present embodiment are the same as those of embodiment 23. Raw materials are selected: 48 parts of polyether

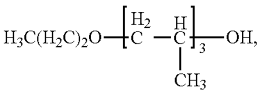

66 parts of carbonyl compound containing isocyanate

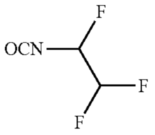

and 3 parts of diluent (selected from a mixture of xylene and dichloromethane); the mass ratio of xylene and dichloromethane is 9:5.

In embodiments 23-37, due to the modifying groups, the above embodiments have more prominent anti-wear functionality on the basis of having the functions such as anti-wear functionality, anti-rust functionality and anti-oxidation. The anti-wear functionality of the above embodiments is explained below through contrast experiments.

Contrast Experiment:

The existing frequently-used anti-wear agents such as zinc dialkyl dithiophosphate (ZDDP), dialkyl dithiocarbamate (ADTC) and dialkyl dithiophosphate (ADDP) are selected as contrast anti-wear agents.

1. Four-ball experiment: The anti-wear functionality of the compound of the present invention and the existing anti-wear agents is inspected according to ASTM D2783-2003(2014) Standard Test Method for Measurement of Extreme-Pressure Properties of Lubricating Fluids and ASTM D2596-19972002) e1 Standard Test Method for Measurement of Extreme-Pressure Properties of Lubricating Grease. The conditions of the four-ball experiment are: rotating speed of 1770 r/min and time of 10s; indexes of characteristics are $P_B$ and $P_O$ values. The smaller the data is, the better the anti-wear functionality is.

2. Anti-wear experiment: The anti-wear functionality of the additive is tested using MTM. Experimental conditions: MTM testing machine adopts "ball-disk" (52100 steel) contact mode, load of 35N, sliding/rolling ratio of 50%, and measuring temperature of 40° C. The smaller the data is, the better the anti-wear functionality is.

3. Cleanliness experiment; The experiment is conducted by SH/T 0269-92 methods. The results include seven levels from 0 to 6. 0 represents the cleanest and lightest, and 6 represents the dirtiest and darkest. The smaller the digit is, the better the cleanliness is.

| Detection result | | | | |
|---|---|---|---|---|
| | Four-Ball Instrument Experiment | | Anti-wear Experiment | |
| | Last Non-Seizure Load $P_B$ (mm) | Sintering Load $P_D$(kg) | (Average Friction Coefficient) | Cleanliness Experiment |
| Embodiment 23 | 0.201 | 250 | 0.021 | 1 |
| Embodiment 24 | 0.199 | 245 | 0.013 | 2 |
| Embodiment 25 | 0.196 | 249 | 0.022 | 1 |
| Embodiment 26 | 0.186 | 256 | 0.019 | 1 |
| Embodiment 27 | 0.199 | 275 | 0.024 | 2 |
| Embodiment 28 | 0.198 | 284 | 0.021 | 1 |

-continued

| Detection result | | | | |
|---|---|---|---|---|
| | Four-Ball Instrument Experiment | | Anti-wear Experiment | |
| | Last Non-Seizure Load $P_B$ (mm) | Sintering Load $P_D$(kg) | (Average Friction Coefficient) | Cleanliness Experiment |
| Embodiment 29 | 0.200 | 263 | 0.017 | 1 |
| Embodiment 30 | 0.200 | 278 | 0.016 | 2 |
| Embodiment 31 | 0.199 | 263 | 0.026 | 2 |
| Embodiment 32 | 0.198 | 294 | 0.019 | 1 |
| Embodiment 33 | 0.197 | 276 | 0.015 | 1 |
| Embodiment 34 | 0.196 | 298 | 0.012 | 1 |
| Embodiment 35 | 0.192 | 298 | 0.012 | 1 |
| Embodiment 36 | 0.196 | 303 | 0.011 | 2 |
| Embodiment 37 | 0.195 | 303 | 0.010 | 1 |
| Barium petroleum sulfonate (T701) | 0.574 | 190 | 0.123 | 6 |
| Dodecenyl succinic acid | 0.632 | 105 | 0.276 | 6 |
| Dodecenyl succinate monoester | 0.615 | 182 | 0.183 | 5 |

It can be seen from the table that the anti-wear functionality of the compound of the present invention is much better than that of the traditional anti-wear agent, and the compound of the present invention also has better anti-wear and cleanliness properties.

The invention claimed is:

1. A polyether derivative, which is a compound with the following structure:

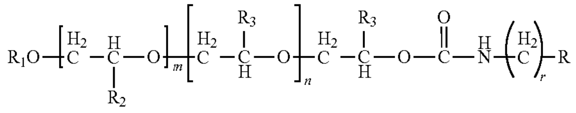

in the formula, m=0-100, and n=0-100; m and n are not both zero; r is 0-5; m, n and r are integers and satisfy charge balance; $R_1$ is alkane of $C_1$-$C_{10}$; $R_2$ is

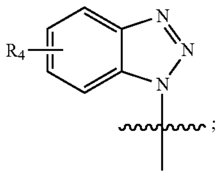

$R_3$ is

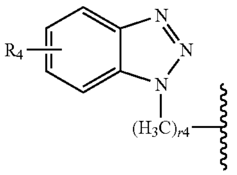

$R_4$ is selected from alkane of $C_1$-$C_2$; $R_4$ isanyy integer of 1-10;

R is one of

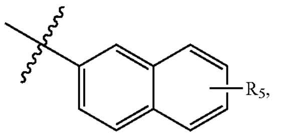

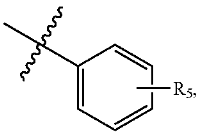

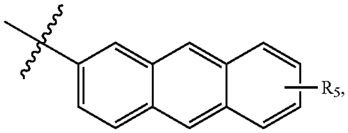

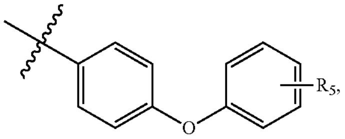

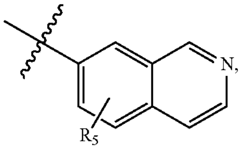

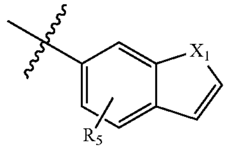

,

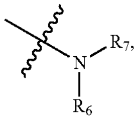

and

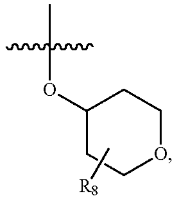

wherein $R_5$ is hydrogen or alkane of $C_1$-$C_5$; $X_1$ is S or O; $R_6$, $R_7$ and $R_8$ are hydrogen or alkane of $C_1$-$C_5$; $X_2$ is one of F, Cl and Br, and $X_2$ is connected at any position of 1, 2 and 3 positions on a benzene ring; $r_1$ is any integer of 1-3; $r_2$ is any integer of 0-2; and $r_3$ is any integer of 1-3, wherein the compound does not comprise following structures: when $R_1$ is butyl, $R_2$ is hydrogen or methyl, $R_3$ is ethyl and R is phenyl or benzyl.

2. A polyether derivative, which is a compound with the following structure:

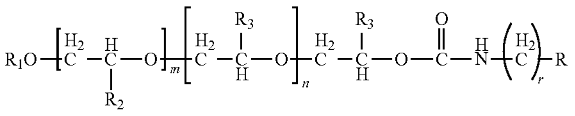

in the formula, m=0-50, and n=0-50; m and n are not both zero; r is 0-5; m, n are not both zero; $R_1$ is alkane of $C_1$-$C_5$; $R_2$ is hydrogen or methyl; $R_3$ is alkane of $C_2$-$C_5$; $R_4$ is hydrogen or alkane of $C_1$-$C_4$; $r_4$ is any integer of 1-20;

R is one of

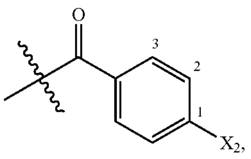

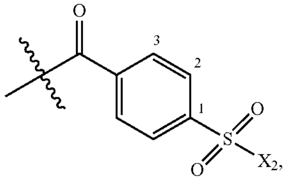

-continued

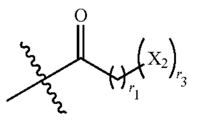

and

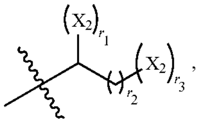

, wherein $R_5$ is hydrogen or alkane of $C_1$-$C_{20}$; $X_1$ is S or O; $R_6$, $R_7$ and $R_8$ are hydrogen or alkane of $C_1$-$C_5$; $X_2$ is one of F, Cl and Br, and $X_2$ is connected at any position of 1, 2 and 3 positions on a benzene ring; $r_1$ is any integer of 1-3; $r_2$ is any integer of 0-2; and $r_3$ is any integer of 1-3, wherein the compound does not comprise following structures: when $R_1$ is butyl, $R_2$ is hydrogen or methyl, $R_3$ is ethyl and R is phenyl or benzyl, wherein $X_2$ is one of F, Cl and Br, and is in the benzene ring; $X_2$ is connected at any position of 1, 2 and 3 positions on the benzene ring; $r_1$ is any integer of 1-3; $r_2$ is any integer of 0-2; and $r_3$ is any integer of 1-3.

3. A polyether derivative, which is a compound with the following structure:

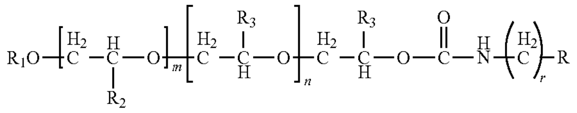

in the formula, m=0-50, and n=0-50; m and n are not both zero; r is 0-5; m and n are both not zero; $R_1$ is alkane of $C_1$-$C_5$; $R_2$ is hydrogen or methyl; $R_3$ is alkane of $C_2$-$C_5$; $R_4$ is hydrogen or alkane of $C_1$-$C_4$; $r_4$ is any integer of 1-20;

wherein $R_5$ is hydrogen or alkane of $C_1$-$C_{20}$; $X_1$ is S or O; $R_6$, $R_7$ and $R_8$ are hydrogen or alkane of $C_1$-$C_5$; $X_2$ is one of F, Cl and Br, and $X_2$ is connected at any position of 1, 2 and 3 positions on a benzene ring; $r_1$ is any integer of 1-3; $r_2$ is any integer of 0-2; and $r_3$ is any integer of 1-3, wherein the compound does not comprise following structures: when $R_1$ is butyl, $R_2$ is hydrogen or methyl, $R_3$ is ethyl and R is phenyl or benzyl;

wherein r is 1-5; R is one of

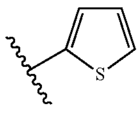

,

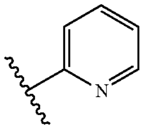

,

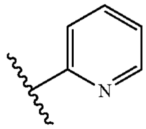

,

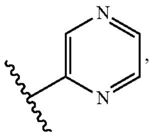

,

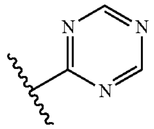

and

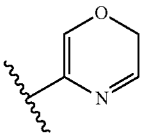

4. A preparation method for the polyether derivative of claim 1, comprising the following steps:

A. weighing raw materials: 40-50 parts of chloro epoxyalkane, a catalyst, alkyl alcohol compound of $C_1$-$C_{15}$, 40-50 parts of benzotriazole or derivatives thereof, 40-50 parts of isocyanate compound, and 0.5-3 parts of diluent; the catalyst comprises Zn—Co bimetallic catalyst or alkaline catalyst; the diluent is composed of solvent A and solvent B with a mass ratio (10-20):(1-5); the solvent A is selected from dichloromethane, trichloromethane and tetrachloromethane; and the solvent B is selected from tetrahydrofuran, furan, pyridine, pyrazine and pyrrole;

B. adding the catalyst to a dry reactor protected by inert gas, with the addition amount of the catalyst being 20-100 ppm (mass ratio) of the polyether derivative that will be theoretically prepared, and then adding the alkyl alcohol compound of $C_1$-$C_{15}$ as initiator and a chloro epoxyalkane, wherein the molar ratio of the initiator and the chloro epoxyalkane is (0.1:1)-(1:5); heating the reactor to 30-100° C.; maintaining pressure to be less than 1.5 MPa; when the temperature starts to rise and the pressure starts to drop, continuously adding another chloro epoxyalkane to the reactor at a rate of 0.5-3 mL/min; continuing the aging for 1-3 hours; stopping the heating and cooling the reactor to room temperature; and filtering to obtain polyether;

C. heating a reaction vessel with polyether to 50-80° C.; slowly adding benzotriazole or derivatives thereof into the vessel; raising the temperature and keeping reaction temperature to 100-120° C. to react for 1-12 hours; and at the end of the reaction, obtaining compound 1 with hydroxyl at an end and benzotriazole in a main chain;

D. dissolving 40-50 parts of isocyanate compound into 0.5-3 parts of diluent; keeping the temperature at 40-50° C.; and stirring for 20-40 minutes to prepare solution 1;

E. dropwise adding the solution 1 to 40-50 parts of compound 1; after dropwise adding, raising the temperature to 50-90° C.; and aging for 1.5-2 hours to obtain the polyether derivative.

5. A preparation method for the polyether derivative of claim 2, comprising the following steps:

A. weighing raw materials: 40-50 parts of polyether, 40-70 parts of carbonyl compound containing isocyanate and 1-3 parts of diluent; the polyether comprises a polyether compound, one side of the polyether compound is ended by $C_1$-$C_5$ alkoxy, and segments of the polymer are selected from homopolymer or copolymer of following structures: polyethylene glycol, polyethylene oxide polypropylene oxide polytetrahydrofuran homopolymer, and poly long chain epoxy alkane; the carbonyl compound containing isocyanate is selected from any one of

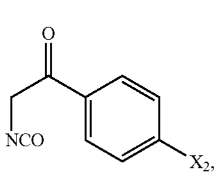

,

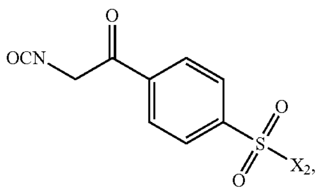

,

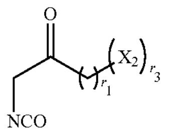

and

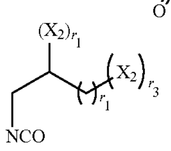

groups, wherein $X_2$ is one of F, Cl and Br, and $X_2$ is connected at any position of 1, 2 and 3 positions on the benzene ring; $r_3$ is any integer of 1-3; $r_1$ is any integer of 1-3; and $r_2$ is any integer of 0-2;

B. dissolving 40-70 parts of carbonyl compound containing isocyanate into 1-3 parts of diluent; keeping the temperature at 40-50° C.; and stirring for 20-40 minutes to prepare solution 1;

C. dropwise adding the solution 1 to 40-50 parts of polyether at 0.1-1 mL/min; after dropwise adding, raising the temperature to 50-90° C.; and aging for 1.5-2 hours to obtain the polyether derivative.

6. A preparation method for the polyether derivative of claim 3, comprising the following steps:

A. weighing raw materials: 40-70 parts of polyether, 40-70 parts of aryl compound containing isocyanate and 0.5-3 parts of diluent; the diluent is formed by mixing solvent A and solvent B with a mass ratio (10-20):(1-5); the solvent A is selected from dichloromethane, trichloromethane and tetrachloromethane; and the solvent B is selected from tetrahydrofuran, furan, pyridine, pyrazine and pyrrole;

B. dissolving the aryl compound containing isocyanate into the diluent to obtain solution 1; dropwise adding the solution 1 to a reaction vessel containing polyether at temperature of 50-60° C. and at a rate of 0.1-2 mL/min; and after dropwise adding, continuing the stirring for 20-40 min;

C. heating the reaction vessel to 60-90° C.; and aging for 1-2 hours to obtain the polyether derivative.

7. The preparation method for the polyether derivative according to claim 6, wherein the polyether comprises a polyether compound, one side of the polyether compound is ended by $C_1$-$C_5$ alkoxy, and segments of the polymer are selected from homopolymer or copolymer of following structures: polyethylene glycol, polyethylene oxide, polypropylene oxide, polytetrahydrofuran homopolymer, and poly long chain epoxy alkane.

8. The preparation method for the polyether derivative according to claim 6, wherein in the aryl compound containing isocyanate, the aryl group is selected from any one of

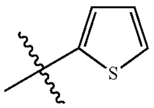,
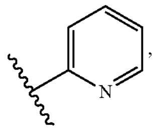,
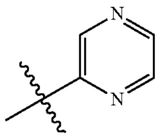,
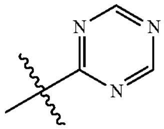
and
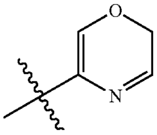.

* * * * *